United States Patent
Moutchkaev et al.

(10) Patent No.: US 7,715,465 B2
(45) Date of Patent: May 11, 2010

(54) CORRELATION METHOD TO ADAPTIVELY OPERATE IN TIME VARYING PHASE AND CORRELATOR THEREOF

(75) Inventors: Artem Moutchkaev, Yongin-si (KR); Woo-Shik Kang, Suwon-si (KR); Si-gyoung Koo, Seoul (KR); Ji-hun Koo, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 836 days.

(21) Appl. No.: 11/505,409

(22) Filed: Aug. 17, 2006

(65) Prior Publication Data

US 2007/0124356 A1 May 31, 2007

(30) Foreign Application Priority Data

Nov. 30, 2005 (KR) ........................ 10-2005-0115570

(51) Int. Cl.
*H04B 1/00* (2006.01)
(52) U.S. Cl. ........................ 375/150; 375/142; 375/143; 375/152; 375/316
(58) Field of Classification Search ................. 375/150, 375/142, 143, 152, 316
See application file for complete search history.

(56) References Cited

U.S. PATENT DOCUMENTS

| | | | | |
|---|---|---|---|---|
| 6,128,331 A * | 10/2000 | Struhsaker et al. | ........... | 375/142 |
| 6,487,237 B1 * | 11/2002 | Imaizumi | ..................... | 375/149 |
| 6,735,243 B1 * | 5/2004 | Akopian | ..................... | 375/150 |

* cited by examiner

*Primary Examiner*—Ted M Wang
(74) *Attorney, Agent, or Firm*—Sughrue Mion, PLLC

(57) ABSTRACT

Disclosed is a correlation method to adaptively operate in a time varying phase and a correlator thereof. A correlation method according to the present invention includes performing the first correlation according to a certain reference value and a certain reference interval for correlation of a received signal; calculating an average variation of the received signal through the result of performing the first correlation; deciding a new reference value for the second correlation through the average variation; performing the second correlation according to the new reference value and the reference interval; and selecting the maximum value among the result of performing the second correlation. Accordingly, plural references are decided considering variation of a response signal between tags and also separate plural references are decided considering bit variation of a response signal in the same tag, so that a digital signal can be ideally demodulated in the environment where signal phase variation occurs.

17 Claims, 3 Drawing Sheets

CORRELATION METHOD TO ADAPTIVELY OPERATE IN TIME VARYING PHASE AND CORRELATOR THEREOF

CROSS-REFERENCE TO RELATED APPLICATIONS

This application claims benefit under 35 U.S.C. §119(a) of Korean Patent Application No. 2005-115570, filed Nov. 30, 2005 in the Korean Intellectual Property Office, the entire contents of which are incorporated herein by reference.

BACKGROUND OF THE INVENTION

1. Field of the invention

The present invention relates to a correlation method and a correlator. More particularly, the present invention relates to a correlation method to adaptively operate in a time varying phase and a correlator thereof.

2. Description of the Related Art

A correlator is an electronic device to separate a weak information signal from noise by estimating a correlation function. Correlators such as a magnetic correlator and a cross correlator are known in the art.

Bit variations frequently occur in tags, specifically in low-cost tags that are essential to implement a ubiquitous computing technology. These variations can occur in a single tag according to the communications environment. However, variations also occur in tags needing no variation.

FIG. 1 shows types of a variation in a tag.

In FIG. 1, a positive phase variation of $a_1$ is present in Tag 1, and a negative phase variation of $a_2$ is present in Tag 2. In addition, there is also a bit variation T2-T1 between Tag 1 and Tag 2.

That is, there can be a variation of a signal phase in the tag because of reader backscatter communications where a symbol section changes due to the fast-changing communications environment. The variation can also be due to an unstable tag clock. Moreover, a symbol section can change between tags due to a different communications distance.

Conventional zero crossing detectors or cross-correlators can deal with the problems. However, the zero-crossing detector requires relatively large SNR which can not be frequently provided in backscatter communications.

It should be noted that the cross-correlator is based on the assumption that the symbol section of the received signals is essentially invariant. If the assumption of invariance in question is violated, the mentioned technique is likely to produce errors.

SUMMARY OF THE INVENTION

An aspect of the present invention is to solve at least the above problems and/or disadvantages and to provide at least the advantages described below. Accordingly, an aspect of the present invention is to provide a correlation method and a correlator to ideally demodulate a digital signal in the environment where a variation of a signal phase between symbols in one tag and/or between tags appears.

In order to achieve the above-described aspect of the present invention, there is provided a correlation method, comprising performing a first correlation according to a reference value and a reference interval for correlation of a received signal. An average variation of the received signal is calculated based on results of the first correlation. A new reference value is decided based on the average variation. A second correlation is performed based on the new reference value and the reference interval. A maximum value is selected based on results of the second correlation.

Preferably, the reference interval is decided considering a bit variation.

Performing the first correlation performs correlation in the reference value and a reference value, which is as much as the reference interval apart from the reference value.

The first correlation is sliding correlation for a preamble section of the received signal.

The correlation method further comprises determining whether the preamble section is completed.

The new reference value is the closest to the average variation.

Performing the second correlation performs correlation in the new reference value and a reference value, which is as much as the reference interval apart from the new reference value.

The second correlation is block sliding correlation for a data section of the received signal.

The correlation method further comprises determining whether the data section is completed.

The correlation method further comprises calculating a beginning point of the second correlation.

Another aspect of the invention is a correlator that comprises a correlation part, a calculator, a reference decider and a selector. The correlation part is operable to perform a first correlation according to a reference value and a reference interval for correlation of a received signal. The calculator is operable to calculate an average variation of the received signal by performing the first correlation. The reference decider is operable to decide a new reference value for a second correlation based on the average variation. The selector is operable to select the maximum value from results of performing the second correlation. The correlation part performs the second correlation based on the new reference value and the reference interval.

Preferably, the reference interval is decided considering a bit variation.

The correlator performs the first correlation in the reference value and a reference value, which is as much as the reference interval apart from the reference value.

The first correlation is sliding correlation for a preamble section of the received signal.

The correlator further comprises a reference storage for storing the reference value and the reference interval.

The new reference value is the closest to the average variation.

The correlator performs the second correlation in the new reference value and a reference value, which is as much as the reference interval apart from the new reference value.

The second correlation is block sliding correlation for a data section of the received signal.

The calculator calculates a beginning point of the second correlation.

BRIEF DESCRIPTION OF THE DRAWING FIGURES

The above aspect and other features of the present invention will become more apparent by describing in detail exemplary embodiments thereof with reference to the attached drawing figures, wherein.

DETAILED DESCRIPTION OF THE EXEMPLARY EMBODIMENTS

Figure 1:
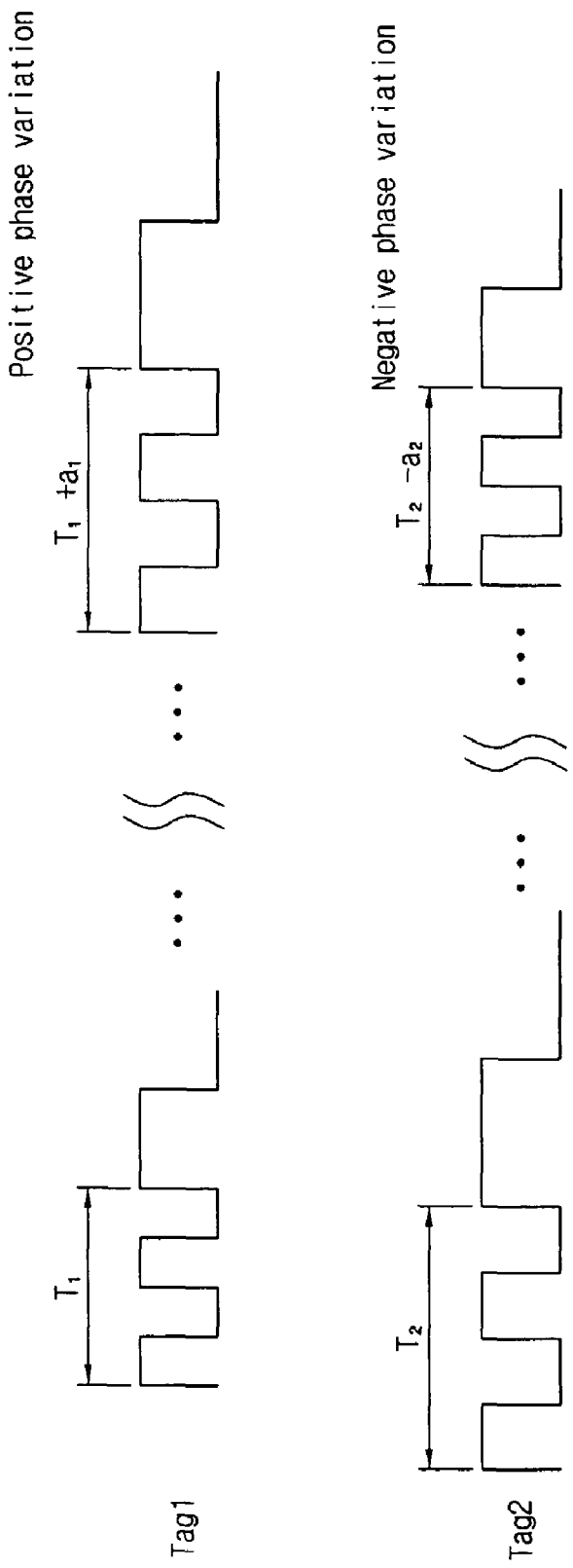
FIG. 1 shows types of a variation in a tag.

Hereinafter, an embodiment of the present invention will be described in detail with reference to the accompanying drawing figures.

In the following description, same drawing reference numerals are used for the same elements even in different drawings. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

A correlation method and correlator intend to ideally demodulate a digital signal in the environment where a variation of a signal phase between symbols in one tag and/or between tags appears is provided.

A signal has a preamble section and a data section. In an exemplary implementation of the present invention, correlation using a sliding technique is performed to detect a preamble and correlation using a block sliding technique is performed to detect data.

That is, sliding correlation synchronizes and detects a symbol section of only the preamble. The sliding correlation requires positive correlation calculation.

The correlation method and correlator according to an exemplary implementation of the present invention detects a tag signal section based on sliding correlation and three reference signals. Here, a known preamble is used.

Meanwhile, block sliding correlation detects and decodes an input sequence. The block sliding correlation requires the known symbol section. Meanwhile, correlation calculation is not needed. Sliding correlation and block sliding correlation can be implemented in one correlator.

Figure 2:
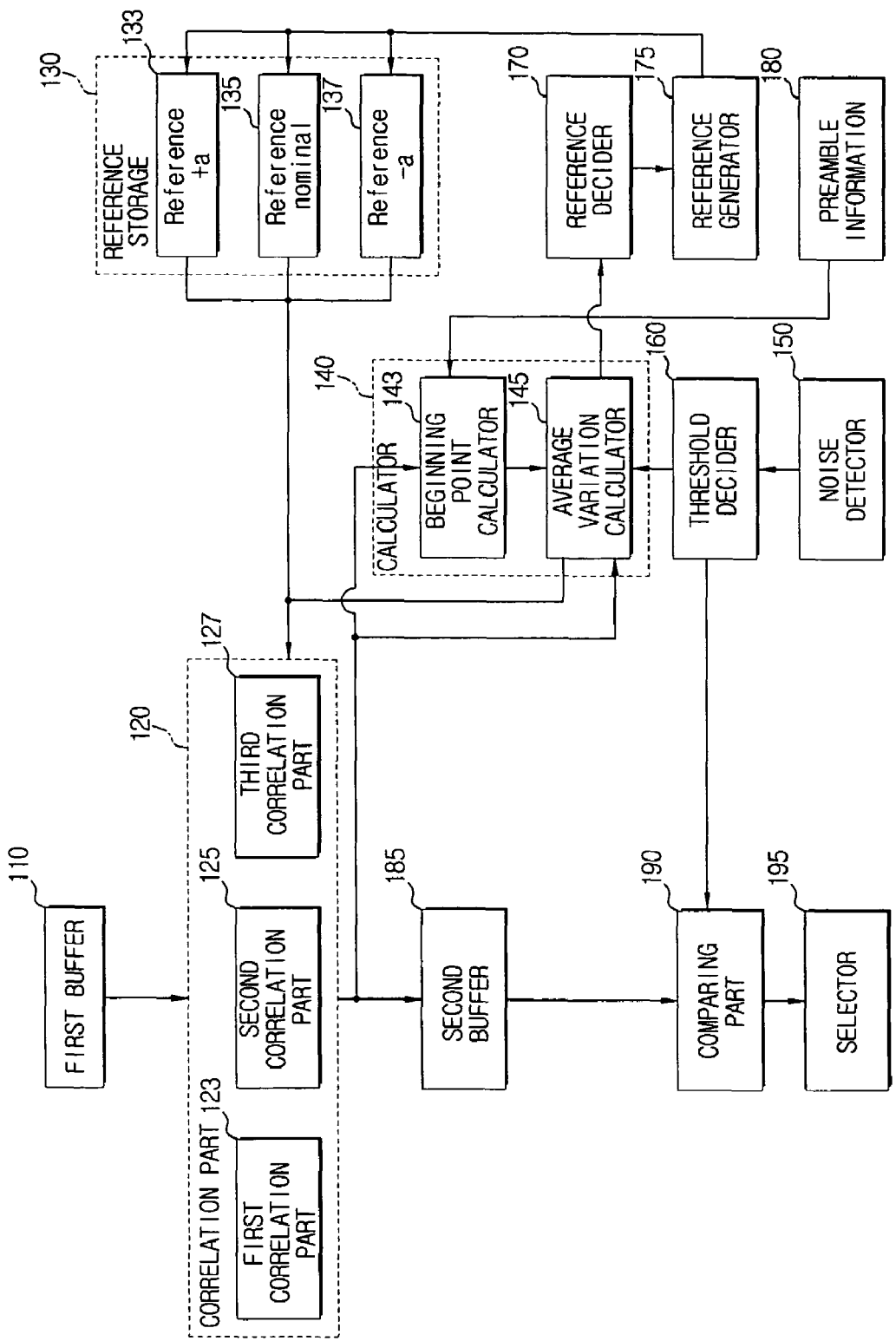
FIG. 2 is a schematic diagram showing a correlator to adaptively operate in a time varying phase according to an embodiment of the present invention.

FIG. 2 is a schematic diagram showing a correlator to adaptively operate in a time varying phase according to an embodiment of the present invention.

Referring to FIG. 2, a correlator according to an embodiment of the present invention includes a first buffer 110, a correlation part 120, a reference storage 130, a calculator 140, a noise detector 150, a threshold decider 160, a reference decider 170, a reference generator 175, a preamble information 180, a second buffer 185, a comparing part 190 and a selector 195.

The first buffer 110 reads a signal input from a analog-to-digital converter (ADC) to transmit to the correlation part 120.

The correlation part 120 performs the first correlation (sliding correlation) and the second correlation (block sliding correlation) of the signal input from the first buffer 110. In addition, the correlation part 120 has plural sub-correlation parts (a first correlation part 123, a second correlation part 125 and a third correlation part 127) considering variation between tags and variation between symbols in one tag.

The correlation part 120 according to an embodiment of the present invention can be implemented to have three sub-correlation parts or more, or to repeat correlation by only one correlation part instead of plural sub-correlation parts.

The reference storage 130 stores reference values necessary to correlation of the correlation part 120 in each storage 133, 135, 137 to input to the correlation part 120.

The calculator 140 has a beginning point calculator 143 and an average variation calculator 145. The beginning point calculator 143 calculates a beginning point of block sliding correlation using the values output from the correlation part 120, and the average variation calculator 145 calculates an average value of variations using the values output from the correlation part 120.

The noise detector 150 measures a condition of the communications environment to transmit to the threshold decider 160. The threshold decider 160 separates a signal having certain times more than an average noise as an effective signal to transmit to the average variation calculator 145 and the comparing part 190.

The reference decider 170 decides a reference and a reference interval to perform correlation using a value output from the average variation calculator 145 to transmit to the reference generator 175. The reference generator 175 generates reference values for correlation using the reference and reference interval from the reference decider 170.

According to an embodiment of the present invention, if it is assumed that the reference decided through the reference decider 170 is N and the reference interval is a, the reference generator 175 generates N−a, N and N+a for the reference values and stores them in the reference storage 130.

In other words, the reference decider 170 generates the three copies of a symbol according to the expected phase deviation −a, 0, +a. Such three copies become a nominal reference with N samples, a reference with N−a samples, and a reference with N+a samples.

Meanwhile, the preamble information 180 inputs preamble information of a signal to the beginning point calculator 143. The comparing part 190 compares the values output from the correlation part 120 to transmit to the selector 195 and the selector 195 selects a maximum value among the values.

Figure 3:
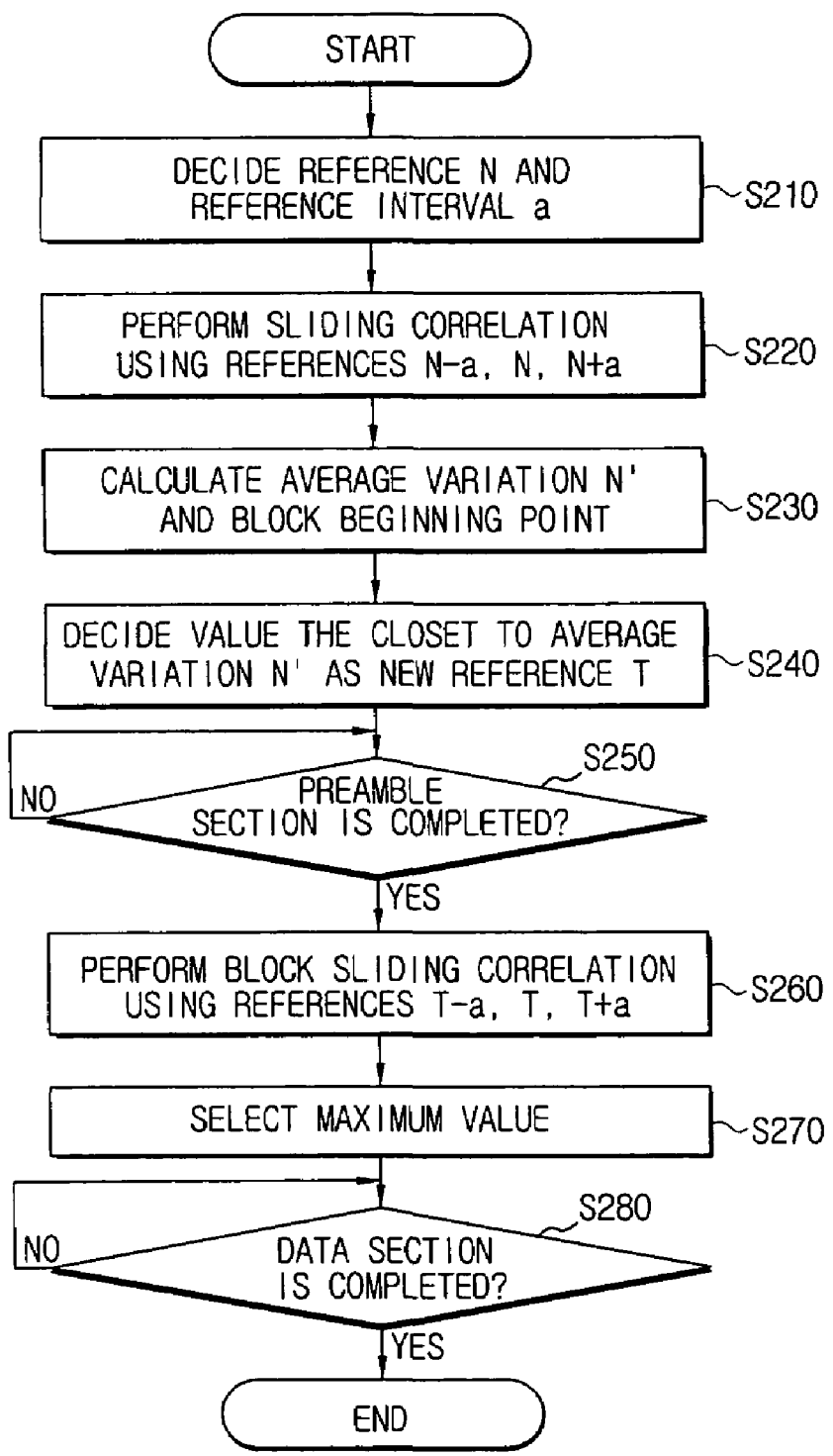
FIG. 3 is a flow chart showing a correlation method to adaptively operate in a time varying phase according to an embodiment of the present invention.

FIG. 3 is a flow chart showing a correlation method to adaptively operate in a time varying phase according to an embodiment of the present invention. Referring to FIGS. 2 and 3, first the reference decider 170 voluntarily decides a reference N and reference interval a to perform sliding correlation (S210). The reference N and reference interval a can be input from outside.

The reference generator 175 generates references N−a, N, N+a for sliding correlation and stores them in the reference storage 130. The reference storage 130 inputs the references N−a, N, N+a to the correlation part 120, and then the first correlation part 123, second correlation part 125 and third correlation part 127 perform sliding correlation using the references N−a, N, N+a, respectively (S220).

The values output from the correlation part 120 are transmitted to the calculator 140 and the calculator 140 calculates an average variation N' in the present tag and a block beginning point when block sliding correlation starts using the values (S230).

For detailed description of S230, first the average variation calculator 145 calculates an average variation N', a variation during the preamble of a single tag, as follows.

The locations of maximum values of the first '1' and the last '1' are selected.

The number of samples N between the selected locations is calculated.

N' is obtained by dividing N by the number of sections in the preamble.

Additionally, block sliding correlation is performed to calculate the next data and at the moment the beginning point of the block has to be decided. The beginning point calculator 143 calculates the point where '1' is located in the preamble as the beginning point of the block.

Moreover, in order to perform block sliding correlation considering a variation between symbols, the reference decider 170 decides a value, which is the closest to the average variation N' output from the average variation calculator 145, as a new reference T (S240).

For detailed description of S240, the new reference T is decided by the following Equation 1.

$$T=\min\{|N'-N|, |N'-(N-a)|, |N'-(N+a)|\} \quad \text{[Equation 1]}$$

where T is the new reference, N' is the average variation and (N, N−a, N+a) is the reference in S220. The reference decider 170 can voluntarily decide a new reference interval a deciding the new reference T.

Subsequently, whether the preamble section is completed can be determined (S250). If the preamble section is not completed, S220 to S240 are repeated. If the preamble section is completed, block sliding correlation for the data section of the signal is performed.

At the moment, the reference generator 175 generates references T−a, T, T+a for block sliding correlation and stores them in the reference storage 130. The reference storage 130 inputs the references T−a, T, T+a to the correlation part 120, and then the first correlation part 123, second correlation part 125 and third correlation part 127 perform block sliding correlation using the references T−a, T, T+a, respectively (S260).

The values output from block sliding correlation are input to the second buffer 185 and the second buffer 185 transmits them to the comparing part 190. The comparing part 190 receives a threshold arrival signal from the threshold decider 160, compares the values output from block sliding correlation input from the second buffer 185, and transmits the values to the selector 195. Next, the selector 195 selects the maximum value among the values output from block sliding correlation (S270).

Subsequently, whether the data section is completed can be determined (S280).

If the data section is not completed, S260 to S270 are repeated. If the data section is completed, correlation is completed.

As can be appreciated from the above description, plural references are decided considering variation of a response signal between tags and also separate plural references are decided considering bit variation of a response signal in the same tag, so that a digital signal can be ideally demodulated in the environment where signal phase variation occurs.

While the invention has been shown and described with reference to certain embodiments thereof, it will be understood by those skilled in the art that various changes in form and details may be made therein without departing from the spirit and scope of the invention as defined by the appended claims.

What is claimed is:

1. A correlation method, comprising:
    performing, by a correlation part, a first correlation according to a reference value and a reference interval for correlation of a received signal;
    calculating an average variation of the received signal based on results of the first correlation;
    deciding a new reference value based on the average variation;
    performing a second correlation based on the new reference value and the reference interval; and
    selecting a maximum value based on results of the second correlation,
    wherein the reference interval is determined based on a bit variation.

2. The correlation method of claim 1, wherein performing the first correlation performs correlation in the reference value and a second reference value, which is as much as the reference interval apart from the reference value.

3. The correlation method of claim 1, wherein the first correlation is a sliding correlation for a preamble section of the received signal.

4. The correlation method of claim 3, further comprising determining whether the preamble section is completed.

5. The correlation method of claim 1, wherein the new reference value is closest to the average variation.

6. The correlation method of claim 1, wherein performing the second correlation performs correlation in the new reference value and a third reference value, which is as much as the reference interval apart from the new reference value.

7. The correlation method of claim 1, wherein the second correlation is a block sliding correlation for a data section of the received signal.

8. The correlation method of claim 7, further comprising determining whether the data section is completed.

9. The correlation method of claim 1, further comprising calculating a beginning point of the second correlation.

10. A correlator, comprising:
    a correlation part operable to perform a first correlation according to a reference value and a reference interval for correlation of a received signal;
    a calculator operable to calculate an average variation of the received signal by performing the first correlation;
    a reference decider operable to decide a new reference value for a second correlation based on the average variation; and
    a selector operable to select a maximum value from results of performing the second correlation,
    wherein the correlation part performs the second correlation based on the new reference value and the reference interval, and
    wherein the reference interval is determined based on a bit variation.

11. The correlator of claim 10, wherein the correlator is operable to perform the first correlation in the reference value and a second reference value, which is as much as the reference interval apart from the reference value.

12. The correlator of claim 10, wherein the first correlation is a sliding correlation for a preamble section of the received signal.

13. The correlator of claim 10, further comprising a reference storage for storing the reference value and the reference interval.

14. The correlator of claim 10, wherein the new reference value is the closest to the average variation.

15. The correlator of claim 10, wherein the correlator is operable to perform the second correlation in the new reference value and a third reference value, which is as much as the reference interval apart from the new reference value.

16. The correlator of claim 10, wherein the second correlation is a block sliding correlation for a data section of the received signal.

17. The correlator of claim 10, wherein the calculator calculates a beginning point of the second correlation.

* * * * *